United States Patent [19]

Muehlberger et al.

[11] Patent Number: 5,285,382
[45] Date of Patent: Feb. 8, 1994

[54] SYSTEM AND METHOD FOR PROCESSING CREDIT AND DEBIT CARD VALIDITY AND FUNDS TRANSACTIONS FROM VENDING MACHINES AND SIMILAR TERMINALS

[75] Inventors: Karl H. Muehlberger; Gary W. Francis, both of Lakeland, Fla.

[73] Assignee: Keyosk Corporation, Lakeland, Fla.

[21] Appl. No.: 660,722

[22] Filed: Feb. 25, 1991

[51] Int. Cl.⁵ .............................................. G06F 15/21
[52] U.S. Cl. ................................... 364/401; 235/380; 340/825.33
[58] Field of Search ....................... 364/401, 406, 408; 235/379, 380, 381, 382, 382.5; 902/39; 340/825.31, 825.33

[56] References Cited

U.S. PATENT DOCUMENTS

| | | | |
|---|---|---|---|
| 4,485,300 | 11/1984 | Peirce | 235/380 |
| 4,594,663 | 6/1986 | Nagata et al. | 364/408 |
| 4,734,564 | 3/1988 | Boston et al. | 364/408 |
| 4,795,890 | 1/1989 | Goldman | 340/825.33 |
| 4,822,985 | 4/1989 | Boggan et al. | 235/380 |
| 4,868,900 | 9/1989 | McGuire | 235/380 |
| 4,870,259 | 9/1989 | Boggan et al. | 235/380 |
| 4,874,932 | 10/1989 | Kimizu | 235/380 |
| 4,891,503 | 1/1990 | Jewell | 364/408 |
| 4,908,521 | 3/1990 | Boggan et al. | 235/380 |
| 4,943,707 | 7/1990 | Boggan | 235/380 |
| 5,177,342 | 1/1993 | Adams | 235/380 |

Primary Examiner—Robert A. Weinhardt
Assistant Examiner—Jennifer L. Hazard
Attorney, Agent, or Firm—Allen, Dyer, Doppelt, Franjola & Milbrath

[57] ABSTRACT

A system and method for processing credit card transactions includes a data processor with memory storage capable of accessing an electronic clearing facility through a time rated (e.g., long distance) communication link. The system generates a real-time communication with the clearing facility to determine card validity and to initiate funds collection for transactions above a predetermined amount, and generates an off-line batch communication to the clearing facility at a time when communication rates are reduced to initiate funds collection for transactions in the system below the predetermined amount. The system relies upon local card validation, including memory storage of a previously validated card during a predetermined time period, as well as rejection of previously invalidated cards during another predetermined time period. The system and method is particularly useful for remote automated vending machines and automatic teller machines which typically handle a large volume of credit and debit transactions, each of which represents a small dollar amount.

13 Claims, 4 Drawing Sheets

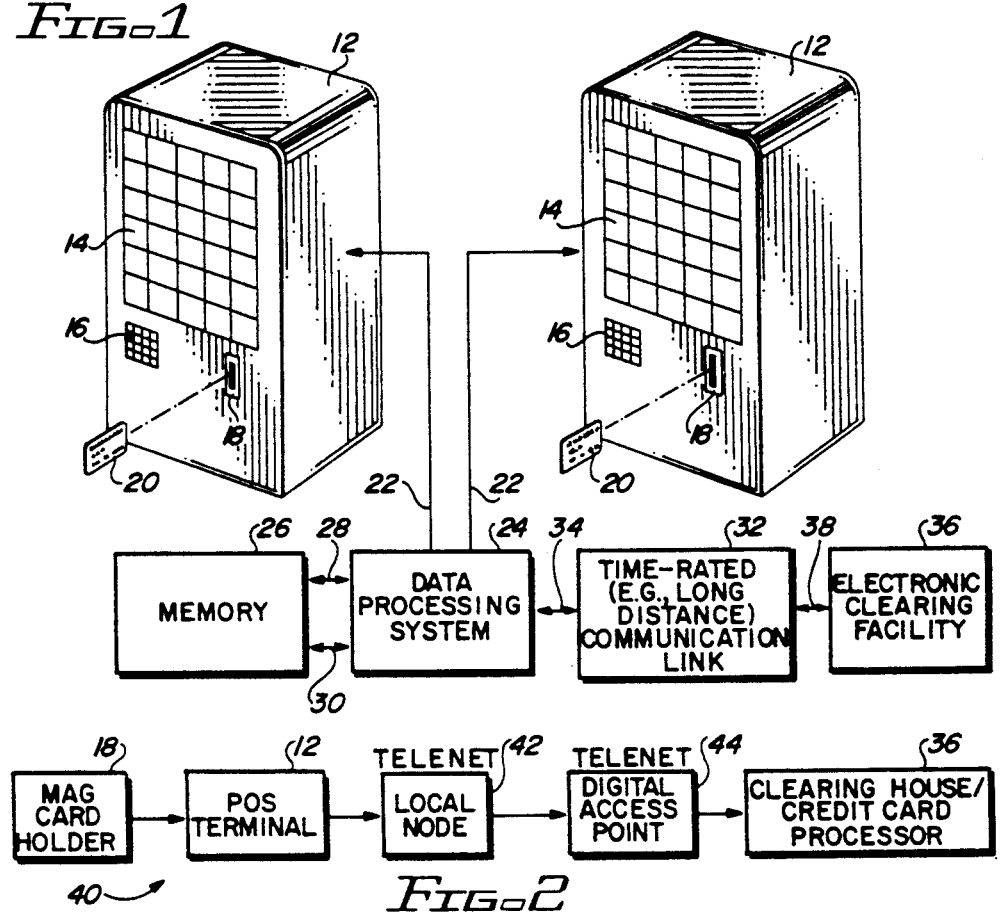
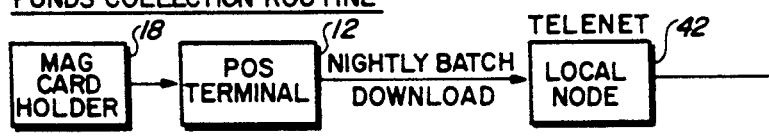
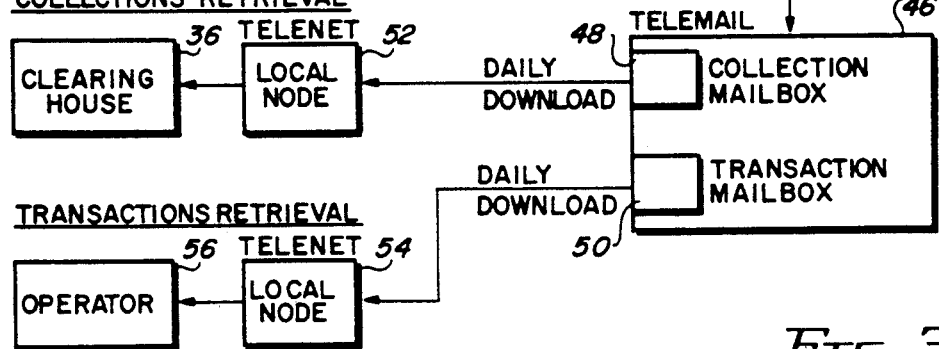
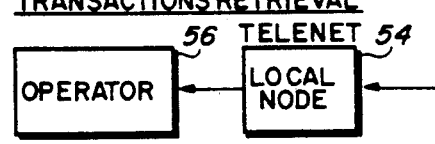

5,285,382

SYSTEM AND METHOD FOR PROCESSING CREDIT AND DEBIT CARD VALIDITY AND FUNDS TRANSACTIONS FROM VENDING MACHINES AND SIMILAR TERMINALS

BACKGROUND OF THE INVENTION

The present invention relates to systems and methods for processing credit and debit card validity and funds collection transactions, and in particular relates to such systems and methods for processing credit and debit card transactions from remote automated installations such as vending machines and similar terminals.

In recent years, there have been developed a number of automated machines for handling credit and debit transactions, including vending machines and automatic bank teller machines. An example of an automated vending machine particularly adapted for dispensing video cassettes is disclosed in U.S. Pat. No. 4,893,705 to Brown, the disclosure of which is incorporated herein by reference. The vending machine disclosed in the Brown '705 patent is electronically operated when a customer presents a credit card or similar coded token, the identity of which is used to control the vending and later return of the video cassette being rented.

At present, there are a number of electronic clearing facilities for receiving real-time inputs from retail establishments as well as from automated vending machines like that taught in the '705 Brown patent via long distance communication links to determine credit card and debit card validity, and to initiate funds collection and/or funds transfer for each transaction. (For shorthand purposes, the term "credit card" is used hereafter to refer to both credit cards and debit cards). In the past, access to the electronic clearing facilities were made across the long distance communications link manually; more recently, automatic credit card readers are placed at each retail facility or vending machine for purposes of reading the customer's credit card, initiating the long distance communication to the clearing facility, addressing the customer's credit card information to the clearing facility and then receiving a confirmation from the clearing facility that the customer's credit card is valid and that the particular transaction in question is within the customer's credit or debit limits.

In the case of electronic vending machines of the type disclosed in the '705 Brown patents, each individual transaction usually is of a rather modest amount, and therefore the long distance communications charges represent a significant operating cost.

SUMMARY OF THE INVENTION

The present invention contemplates a method and system for processing credit card transactions in a system having data processing means and memory storage, and where the system also has means for communicating with an electronic clearing facility for determining card validity and for initiating funds collection or transfer for each credit card transaction. According to the method of the present invention, a real-time communication is generated from the system to the electronic clearing facility to determine card validity and to initiate funds collection for each transaction above a predetermined amount, and only a batch communication is generated between the system and the clearing facility at a time when communication rates are reduced to initiate funds collection or transfer for those transactions in the system below the predetermined amount.

Further in accordance with the method of the present invention, information regarding each customer credit card is stored in memory at the system, and a real-time validation communication is generated from the system to the clearing facility each time a card not stored in memory is used at the system, irrespective of the transaction amount. The information regarding each customer's card is maintained in memory at the system for a first predetermined time period after being validated (e.g., on the order of 15 days). Thereafter the transactions are included with each batch communication for those validated cards identified in memory during the first predetermined time period, and where the cards are used for transactions below the predetermined amount.

It is also preferred in accordance with the present invention that the identity of any card for which the validity has been rejected at the clearing facility be maintained in memory for a second predetermined time period, and thereafter continuously rejecting at the system (without communication to the clearing facility) any previously rejected customer card during the second predetermined time period.

It is also a part of the method that initial steps be taken to conduct local checks at the system with respect to the credit card expiration date and valid card number before either generating a real time communication or storing the transaction for later batch communication to the clearing facility.

The system of the present invention is specifically adapted for use with at least one vending machine having card reader means for receiving a customer's credit card during a specific transaction and providing an output representative of the type, number and expiration date of the customer's credit card and the amount of the customer's transaction. The system further includes data processing and memory storage means for receiving and storing at least a portion of the transaction output and for generating either (a) a real-time output for each specific customer transaction involving a credit card whose identity was not stored in memory for a predetermined time period prior to the transaction or if the transaction is above a predetermined amount, or both; or (b) a batch storage output for each specific customer transaction involving a card whose identity has been stored in memory during the predetermined time period prior to the transaction and where the transaction amount is below the predetermined amount.

The system further includes means for receiving the real-time output of the data processing and storage means and generating a real-time communication through a long distance communication link with an electronic clearing facility to check the validity of the customer card or to initiate funds collection or transfer for the specific customer transaction above the predetermined amount, or both; and means for receiving and storing all of the batch storage outputs for a specified time period and then for generating a batch communication with the electronic clearing facility through a long distance communication link to initiate funds collection or transfer for all specific customer transactions represented by the batch outputs during the specified time period.

DESCRIPTION OF THE DRAWINGS

FIG. 1 is a block diagram illustrating the system and method of the present invention in connection with multiple automatic vending machines of the type disclosed in the Brown '705 patent.

FIG. 2 is a flow chart illustrating the real-time operation of the system shown in FIG. 1.

FIG. 3 is a flow chart illustrating the off line, batch communication configuration of the system of FIG. 1.

DETAILED DESCRIPTION

Figure 4:
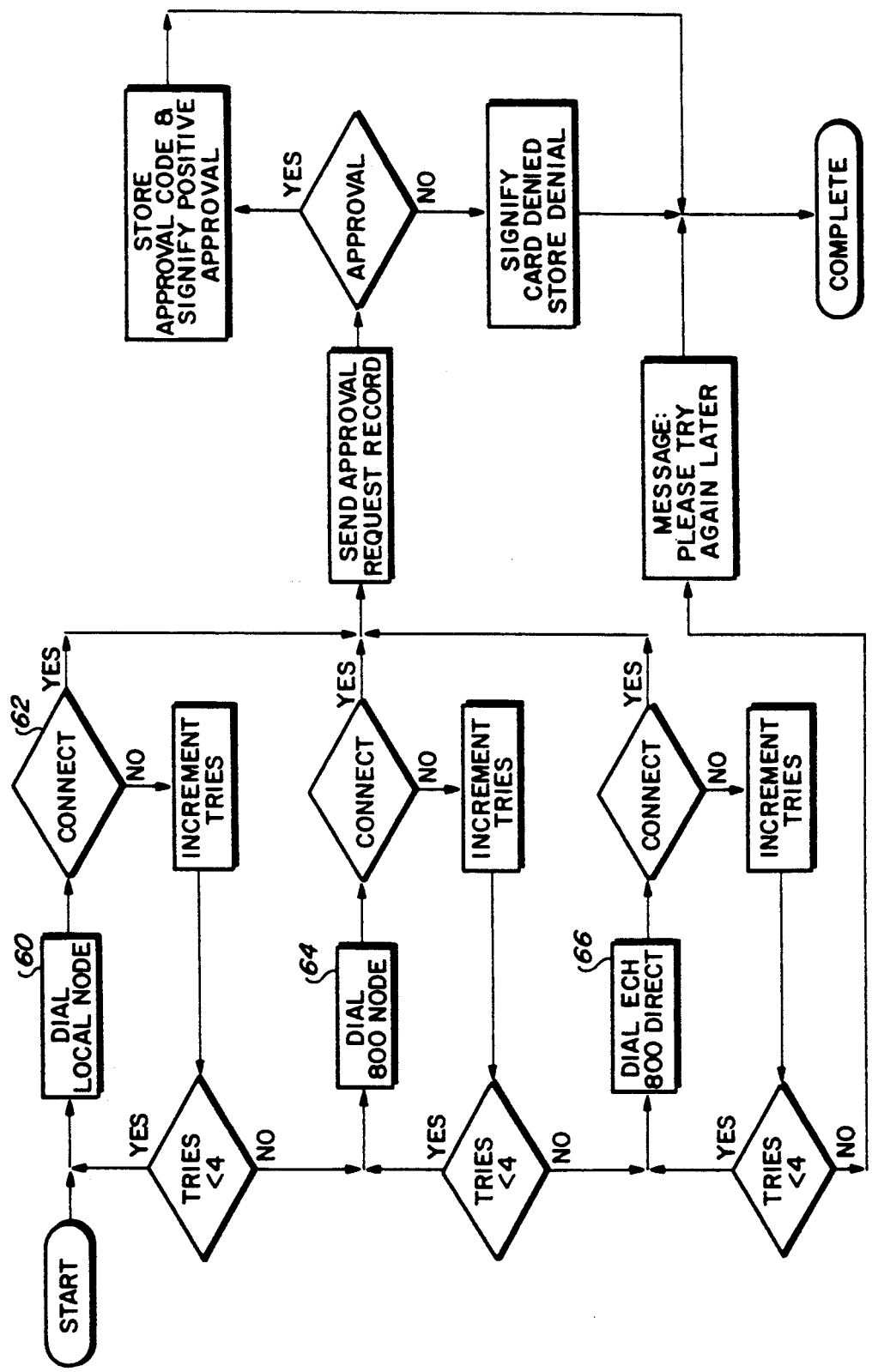
FIG. 4 is a logic diagram and flow chart illustrating the operation of the system and method of the present invention for obtaining credit card approval.

Noting FIG. 1, the system 10 of the present invention is adapted for use with plural automated vending machines 12, which for purposes of this description are similar to the 5 automated vending machines disclosed in the '705 Brown patent, with each vending machine 12 adapted to communicate with a data processing system 24 via a communications link 22. Briefly, each vending machine 12 includes an area 14 for storing the articles to be vended, an input 16 for use by a customer (e.g., a key pad) and a card reader 18 for receiving the customer's credit or debit card 20. It will of course be appreciated that each of the vending machines 12 may itself have a dedicated internal data processing system 24 and a memory storage facility 26, with the communication link thereby being coupled with each vending machine 12. The data processing system 24 includes addressing buses 28 and 30 with the memory storage unit 26. Further, the data processing system 24 has a data input 34 to a communications link 32, which is presumed to be "time-rated", that is, it is presumed that the communications link 32 is a link operated by a member of the regulated telephone industry or an "other common carrier" (OCC) whose long distance telephone traffic rates vary depending on the time of day when the telephone traffic is initiated through the link 32. Typically, the long distance communications rates decrease dramatically during the period between midnight and 6:00 A.M. at the point at which the communication is initiated.

The communications link 32 is accessible through data link 38 to an electronic clearing facility 36, whose function and availability is well known in the credit and debit card clearing industry. At present, there are several major electronic clearing facilities in the United States, including the following:

Electronic Clearing House, Agoura Hills, California
National Data Center, Atlanta, Georgia
McDonnell Douglas Payment Systems, Irvine, California In accordance with the present invention, the data processing system 24 is programmed in a manner described further below with reference to FIGS. 4, 5 and 6 in order to achieve the following system protocol for the handling of customer credit transactions:

One: Each credit card is initially checked locally at the system level for certain predetermined valid card number and expiration date standards.

Two: The system initiates a real-time communication with the electronic clearing facility for each transaction involving a "new" credit card (as defined below), irrespective of the amount of the transaction.

Three: If a "new" credit card is validated by the electronic clearing facility, then the identity of that card is maintained at the system in memory for a first predetermined period of time.

Four: If a "new" credit card is invalidated by the electronic clearing facility, then the identity of that card is maintained in memory at the system for a second predetermined period of time (the first and second predetermined time periods may be the same).

Five: If a previously validated credit card is used in the system during the first predetermined time period for a transaction above a predetermined amount, then a real-time communication with the electronic clearing facility for that transaction is initiated with the electronic clearing facility.

Six: If a previously invalidated credit card is used in the system during the second predetermined time period, the system will reject that card.

Seven: If a previously validated credit card is used in the system during the first predetermined time period for a transaction below the predetermined amount, then the transaction is validated locally without a real-time communication to the electronic clearing facility, and the information regarding the credit card and the transaction is stored in memory at the system together with similar transactions, and then the system later communicates with the electronic clearing facility to down-load all of the stored transactions at a preselected time, for example when communication rates are low.

For purposes of the above protocol, a "new" credit card is one that has never previously been used in the system, or is a previously used credit card used after either the first or second predetermined time periods. Typically, the first and second predetermined time periods are on the order of 15 days, and the predetermined transaction amount may be any selected amount. By way of example, for a video cassette vending machine like that disclosed in the '705 Brown patent, the predetermined transaction amount may be on the order of Twenty Dollars ($20.00).

It will be appreciated by those skilled in the data processing field that the above protocol, and the system of the present invention, may be achieved through a variety of hardware and software arrangements. One such arrangement is illustrated in FIGS. 2-6, and described in detail below.

FIGS. 2 and 3 respectively illustrate the real-time communication and off line, batch communication configurations of a system in accordance with the present invention. In FIG. 2, it is presumed that the data processing system 24 and memory 26 of the system 10 in FIG. 1 is incorporated within the vending machine 12. The arrangement 40 in FIG. 2 illustrates a real-time communication configuration, with the vending machine 12 communicates directly to a local telenet node 42 and/or a digital access node 44 and thence to the electronic clearing facility 36. As thus configured, the system is essentially identical to existing retail credit card validation and transaction collection arrangements.

As is shown in FIG. 3, once it is determined by conventional data processing analysis of the customer's credit card and the customer's transaction amount that the particular transaction meets the conditions of Section Seven of the above-listed protocol, then each such transaction is stored in memory 26 until an appropriate time for batch down-loading of all of those stored transactions to the electronic clearing facility at a time during which the long distance rates for the communication link 32 are at a minimum, thereby significantly reducing the overall costs associated with the operation of each vending machine 12. To this end, the nightly batch is down-loaded to the local node 42 and then to a telemail storage facility 46 including both a "collection mailbox" 48 and a "transaction mailbox" 50. It will of course be understood that the "mailboxes" 48 and 50 are essentially electronic data storage facilities which can be used for collecting data from a number of vending machines 12. At an appropriate time, the batch stored transaction information in the collection mailbox 48 is then down-loaded through a corresponding local telenet node 5 and then to the electronic clearing facility 36. Similarly, the same transaction information stored in the transaction mailbox 50 can be passed through a local node 54 as an activities report containing information regarding both real-time and batch communication to the operator 56 of all of the vending machines for inventory purposes.

Figure 5:
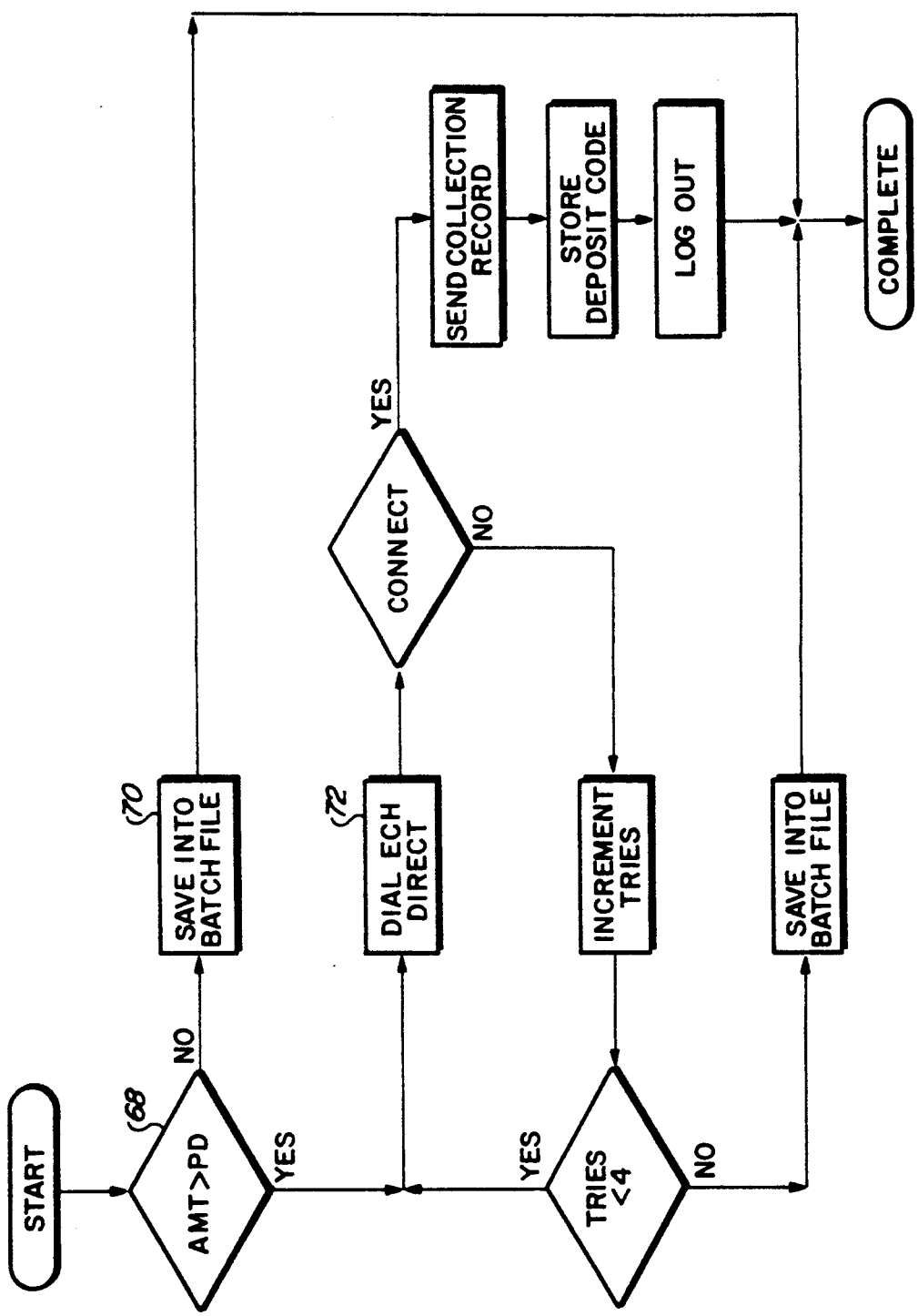
FIG. 5 is a flow chart and logic diagram illustrating the manner in which the system and method of the present invention determines whether a particular transaction will be the subject of a real-time transaction or a batch transaction.
Figure 6:
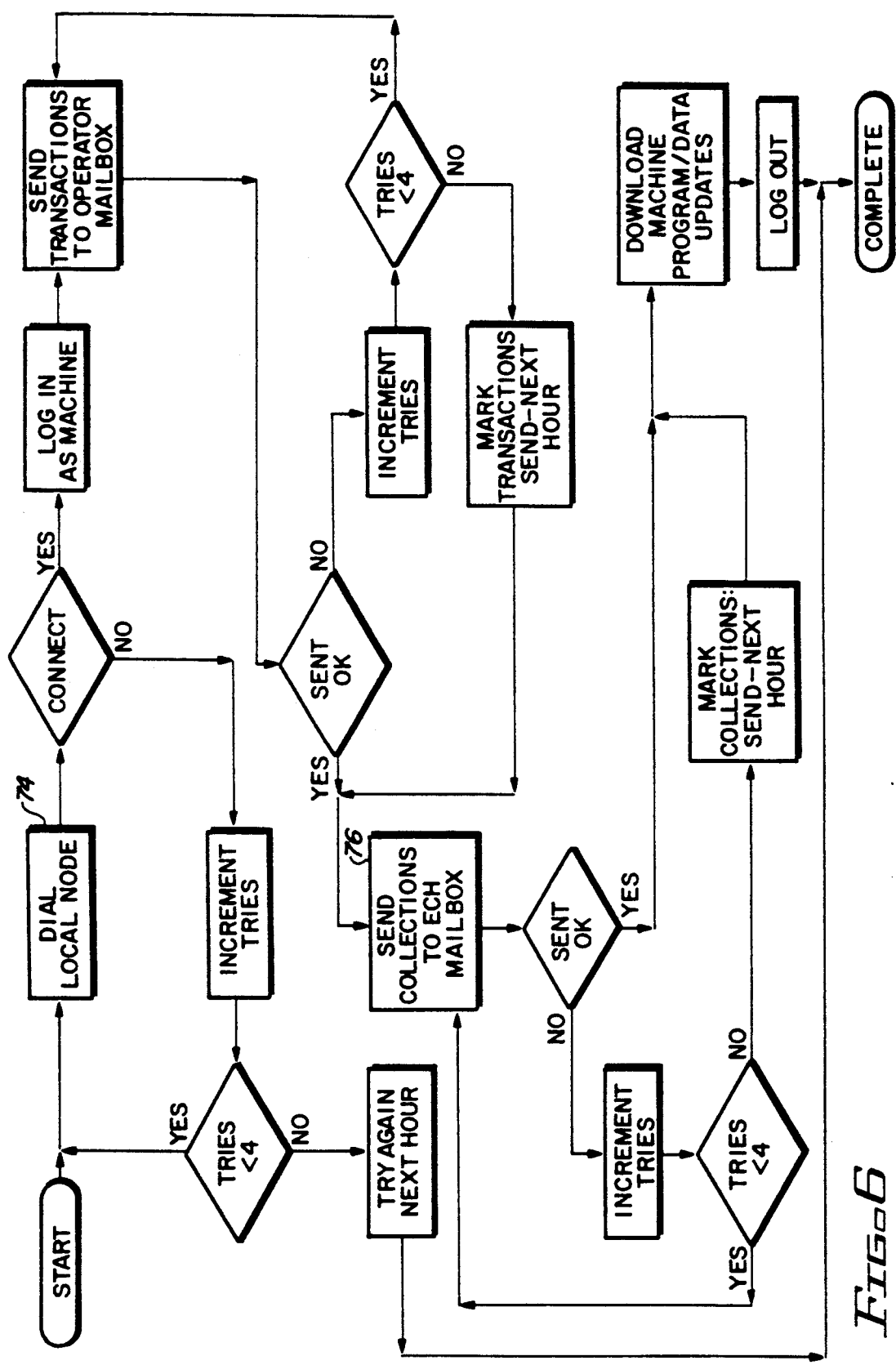
FIG. 6 is a flow chart and logic diagram illustrating the operation of the system and method for controlling storage of batch customer transactions for off line communications to an electronic clearing facility.

FIGS. 4, 5 and 6 are data processing logic diagrams that respectively illustrate the procedure by which the system 10 determines whether a credit card approval communication to the electronic clearing facility 36 is appropriate (FIG. 4), whether a real-time communication for funds transfer is appropriate (i.e., the transaction amount exceeds the predetermined amount) or an off line batch storage is appropriate (FIG. 5), and the manner in which the batch stored transactions are up-loaded and down-loaded (FIG. 6). In each of those figures, conventional logic symbols are used.

In the case of the credit card approval configuration (FIG. 4), the system 10 tries three times to connect to the local node 42 first (FIGS. 2 and 3) at 60. If that connection is not made at 62, the system 10 will try three times to connect to a first toll free (1–800) number, if available, to a designated electronic clearing facility 36, as shown at 64. If this connection fails also, the system 10 will then try another electronic clearing facility's 800 number at 66. In any case that results in a connection, the system 10 will then send a formatted approval request record to the electronic clearing facility 36. The facility 36 replies with an approval or denial in a standard format. The data processing system 24 recognizes the approval or denial reply and acts accordingly pursuant to the above-stated protocol.

The direct, real-time transaction (i.e., the transaction is above the predetermined amount) or alternatively the off line storage deposit (i.e., the transaction amount is less than the predetermined amount) is outlined in FIG. 5. At the first juncture 68, the amount is determined as to be above or below the "PD" (predetermined amount). If the response to that inquiry is negative, then the amount is saved in the batch file 70. On the other hand, if the answer to that inquiry is affirmative, then a real-time communication 72 with the electronic clearing facility 36 is initiated according to the logic diagram of FIG. 4.

The manner in which off line batch stored transactions are handled is disclosed in FIG. 6. In this configuration, the system 10 automatically initiates a communications link at 74 during a time of the day when the long distance telephone rates are at the lowest, presumably during early morning hours. The diagram of FIG. 6 also illustrates the flow 76 into the collection mailbox 48 and the transaction (operator) mailbox 50.

It will thus be understood that the system and method of the present invention permits the processing of a large number of credit card transactions for relatively modest amounts in an efficient, profitable manner for an automated, remote vending machine or similar facility having data processing means and memory storage and which is capable of establishing communication with an electronic clearing facility.

This concludes the description of the preferred embodiments. A reading by those skilled in the art will bring to mind various changes without departing from the spirit and scope of the invention. It is intended, however, that the invention only be limited by the following appended claims.

What is claimed is:

1. A method for processing credit card transactions in a system having data processing means and memory storage, the system also having means for communicating with an electronic clearing facility for determining card validity and for initiating funds collection for each credit card transaction in the system, the method comprising the steps of:

generating a real-time communication between the system and the electronic clearing facility to determine card validity and to initiate funds collection for each transaction above a predetermined amount; and generating a batch communication between the system and the clearing facility at a time when communication rates are reduced to initiate funds collection for all transactions in the system below the predetermined amount.

2. The method recited in claim 1 further comprising the steps of:

storing in memory at the system information for each card used in the system; and generating a real-time validation communication from the system to the clearing facility each time a card not stored in memory is used at the system, irrespective of the transaction amount.

3. The method recited in claim 2 further comprising the steps of:

maintaining information regarding each card in memory at the system for a first predetermined time period after being validated; and including in each batch communication those transactions for validated cards identified in memory during the first predetermined time period, where said cards are used for transactions below the predetermined amount.

4. The method recited in claim 3 further comprising the steps of:

also maintaining in memory at the system for a second predetermined time period the identification of any card the validity of which has been rejected by the clearing facility; and rejecting at the system any previously rejected card during the second predetermined time period without generating a real-time communication to the clearing facility.

5. The method recited in claim 1 further comprising the step of validating the expiration date of each card at the system before generating a real time communication to the clearing facility.

6. The method recited in claim 1 further comprising the step of checking the card for a valid card number at the system before generating a real-time communication to the clearing facility.

7. The method recited in claim 1 further comprising the step of generating an activities report for the system, the activities report containing information regarding both real-time and batch communications.

8. A method for processing credit card transactions taking place in a system having data processing means and memory storage, the system also having means for communicating with an electronic clearing facility for determining card validity and for initiating funds collection for each card transaction, the method comprising the steps of:

maintaining in memory at the system for a predetermined time a record of each card used in a customer transaction in the system;

generating a real-time communication between the system and the clearing facility to determine the validity for each card not presently recorded in memory, or for any transaction above a predetermined amount;

storing in memory information for each transaction below the predetermined amount and for which the card is presently stored in memory; and thereafter generating an off-time batch communication between the system and the clearing facility to initiate the collection of funds for those transactions at the system below the predetermined amount and involving cards for which a record is presently maintained in memory.

9. The method recited in claim 8 further comprising the step of maintaining in memory the record of those credit cards for which a validation was previously received from the clearing facility.

10. The method recited in claim 9 further comprising the steps of:

also maintaining in memory at the system for a preset time period a record of any card the validity of which has been rejected by the clearing facility; and rejecting at the system any previously rejected card during the preset time period without generating a real-time validity communication to the clearing facility.

11. The method recited in claim 8 further comprising the steps of initially conducting checks at the system for card expiration date and valid card number before either generating a real-time communication or storing the transaction for later off-time batch communication to the clearing facility.

12. An automated method for processing credit card transactions in a vending machine having data processing means with memory storage and means for communicating with an electronic clearing facility for determining card validity and for initiating funds collection for credit card transactions, the method comprising the steps of:

for each credit card transaction, initially checking at the vending machine for certain predetermined valid number and expiration date standards;

identifying as new any credit card presented for a transaction for which there is no record in memory at the vending machine and initiating a real-time communication between the vending machine and the electronic clearing facility, irrespective of the amount of the transaction;

maintaining in memory as a known valid credit card for a first predetermined period of time any new credit card which is validated by the electronic clearing facility;

maintaining in memory as a known invalid credit card for a second predetermined period of time the identity of any credit card which is invalidated by the electronic clearing facility;

initiating a real-time communication with the electronic clearing facility during the first predetermined time period to undertake immediate funds collection for any known valid credit card presented for a transaction above a predetermined amount;

rejecting during the second predetermined time period any known invalid credit card;

completing a vending machine transaction during the first predetermined time period for any known validated credit card without a real-time communication to the electronic facility, where the transaction involved is less than the predetermined amount; and generating a batch communication with the electronic clearing facility at an off-time when communication rates are reduced to initiate funds collection for known valid credit cards involving transactions below the predetermined amount.

13. The method recited in claim 12 further comprising the steps of:

storing information for all transactions at a plurality of vending machines; and transmitting a batch communication during an off-time when communication rates are low, the batch communication including the stored transaction information for the plurality of vending machines, to an operator of the vending machines.

* * * * *